United States Patent
Watanabe

(10) Patent No.: US 11,086,272 B2
(45) Date of Patent: Aug. 10, 2021

(54) DIGITAL HOLOGRAPHIC IMAGING APPARATUS

(71) Applicant: OLYMPUS CORPORATION, Hachioji (JP)

(72) Inventor: Satoshi Watanabe, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/195,459

(22) Filed: Nov. 19, 2018

(65) Prior Publication Data

US 2019/0086864 A1 Mar. 21, 2019

Related U.S. Application Data

(63) Continuation of application No. PCT/JP2016/065614, filed on May 26, 2016.

(51) Int. Cl.
*G03H 1/04* (2006.01)
*G02B 21/00* (2006.01)
*G03H 1/08* (2006.01)

(52) U.S. Cl.
CPC ......... *G03H 1/0443* (2013.01); *G02B 21/00* (2013.01); *G02B 21/0008* (2013.01); *G03H 1/041* (2013.01); *G03H 1/0402* (2013.01); *G03H 1/0486* (2013.01); *G03H 1/0866* (2013.01); *G03H 2001/0428* (2013.01);
(Continued)

(58) Field of Classification Search
CPC ...... G02B 21/00; G03H 1/0402; G03H 1/041; G03H 1/0443; G03H 1/0486; G03H 1/0866; G03H 2001/0428; G03H 2001/0447; G03H 2001/0452; G03H 2223/53; H05B 33/0842; H05B 37/029
See application file for complete search history.

(56) References Cited

U.S. PATENT DOCUMENTS

| | | | |
|---|---|---|---|
| 9,007,433 | B2 | 4/2015 | Ozcan et al. |
| 9,012,829 | B2 | 4/2015 | Nakamura |
| 9,546,906 | B2 | 1/2017 | Nakamura |

(Continued)

FOREIGN PATENT DOCUMENTS

| | | | |
|---|---|---|---|
| JP | 2011209395 A | | 10/2011 |
| JP | 2013508775 A | | 3/2013 |
| JP | 2014137378 A | | 7/2014 |

OTHER PUBLICATIONS

International Preliminary Report on Patentability (IPRP) (and English language translation thereof) and Written Opinion dated Nov. 27, 2018 issued in International Application No. PCT/JP2016/065614.

(Continued)

*Primary Examiner* — Joon Kwon
(74) *Attorney, Agent, or Firm* — Holtz, Holtz & Volek PC

(57) ABSTRACT

An illumination unit emits illumination light to a specimen. An image sensor includes multiple pixels arranged in a two-dimensional manner on a photoelectric surface. The image sensor captures an image of a magnitude distribution of an interference pattern formed due to the illumination light that has interacted with the specimen. A limiter limits at least one from among the spatial frequency of the interference pattern formed on the photoelectric surface and the incident angle of the light input to the photoelectric surface.

18 Claims, 15 Drawing Sheets

(52) U.S. Cl.
CPC .............. *G03H 2001/0447* (2013.01); *G03H 2001/0452* (2013.01); *G03H 2223/53* (2013.01)

(56) References Cited

U.S. PATENT DOCUMENTS

| | | | |
|---|---|---|---|
| 2001/0007475 A1* | 7/2001 | Mogamiya | G02B 1/02 348/374 |
| 2006/0257052 A1* | 11/2006 | Chang | G06T 3/4007 382/300 |
| 2011/0233388 A1 | 9/2011 | Nakamura | |
| 2012/0218379 A1 | 8/2012 | Ozcan et al. | |
| 2015/0160450 A1* | 6/2015 | Ou | G02B 21/367 348/80 |
| 2015/0219496 A1 | 8/2015 | Nakamura | |
| 2016/0061730 A1* | 3/2016 | Tagawa | G01N 21/6456 |
| 2016/0231241 A1* | 8/2016 | Pandey | G01N 21/4788 |

OTHER PUBLICATIONS

International Search Report (ISR) (and English language translation thereof) dated Aug. 30, 2016 issued in counterpart International Application No. PCT/JP2016/065614.

Nakatsuji, et al., "Acquisition of 3-D Image in Large Visual Field by Using Phase-Shift Lensless-Fourier Digital Holography", Proceedings of the 3D Image Conference, 2006, p. 113-116.

Japanese Office Action (and English language translation thereof) dated Apr. 7, 2020 issued in Japanese Application No. 2018-518890.

* cited by examiner $A_{(x,y)}$

S2  $I_{(x,y)}$

S2  $I_{S(x,y)}$

S1  $A_{R(x,y)}$

DIGITAL HOLOGRAPHIC IMAGING APPARATUS

BACKGROUND OF THE INVENTION

1. Field of the Invention

The present invention relates to a digital holographic imaging apparatus.

2. Description of the Related Art

A lens-free digital holographic imaging apparatus is employed in order to capture an image of phase distribution information or magnitude distribution information with respect to a cell sample (PCT Patent Publication No. 2013-508775 Japanese Translation). The digital holographic imaging apparatus emits illumination light to a specimen, measures a generated interference pattern by means of an image sensor, and reconstructs the phase distribution information or magnitude distribution information by calculation based on the interference pattern.

As a result of investigating such a digital holographic imaging apparatus, the present inventor has come to recognize the following problem.

In a case in which a digital still camera captures an image of a subject having a spatial frequency that is higher than the Nyquist frequency, the digital still camera has a problem of the occurrence of moire at a position that corresponds to the subject information. In contrast, with the digital holographic imaging apparatus, there is a distance between the imaging surface and the subject surface. Accordingly, due to the propagation calculation (reconstruction processing) based on the information acquired by the imaging surface, local high-frequency components that are higher than the Nyquist frequency on the imaging surface have effects on the overall information with respect to the subject. Specifically, in some cases, a false image (which will be referred to as a "false signal" in the present specification or referred to as "aliases") occurs in a regular manner around the genuine image of the specimen in the phase distribution of the specimen or otherwise the magnitude distribution thereof thus reconstructed. Such a false signal is by no means to be regarded as moire that can occur in an image captured by a digital still camera or the like. In particular, in a case of reconstructing the phase distribution or otherwise the magnitude distribution in detail with respect to a specimen such as cultured cells having a great number of very small subject components each having a similar size, it has been found that such a false signal has non-negligible effects. It should be noted that this consideration is by no means within the scope of general common understanding of those skilled in this art.

SUMMARY OF THE INVENTION

The present invention has been made in view of such a situation. Accordingly, it is an exemplary purpose of an embodiment of the present invention to provide a digital holographic imaging apparatus configured to suppress a false signal.

An embodiment of the present invention relates to a digital holographic imaging apparatus. The digital holographic imaging apparatus comprises: an illumination unit structured to emit an illumination light to a specimen; an image sensor comprising multiple pixels arranged on a photoelectric surface (also called as photosensitive surface or conversion surface) thereof in a two-dimensional manner, and structured to capture an image of a magnitude distribution of an interference pattern generated due to the illumination light that has interacted with the specimen; and a limiter structured to limit at least one from among a spatial frequency of the interference pattern formed on the photoelectric surface and an incident angle at which the light is input to the photoelectric surface.

An embodiment of the present invention relates to a digital holographic imaging apparatus. The digital holographic imaging apparatus comprises: an illumination unit structured to emit an illumination light to a specimen; an image sensor comprising multiple pixels arranged on a photoelectric surface thereof in a two-dimensional manner, and structured to capture an image of a magnitude distribution of an interference pattern formed due to the illumination light that has interacted with the specimen; and a limiter provided between the photoelectric surface and the specimen, and structured to interact with a light input to the photoelectric surface so as to remove a false signal from an image reconstructed based on image data captured by the image sensor.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
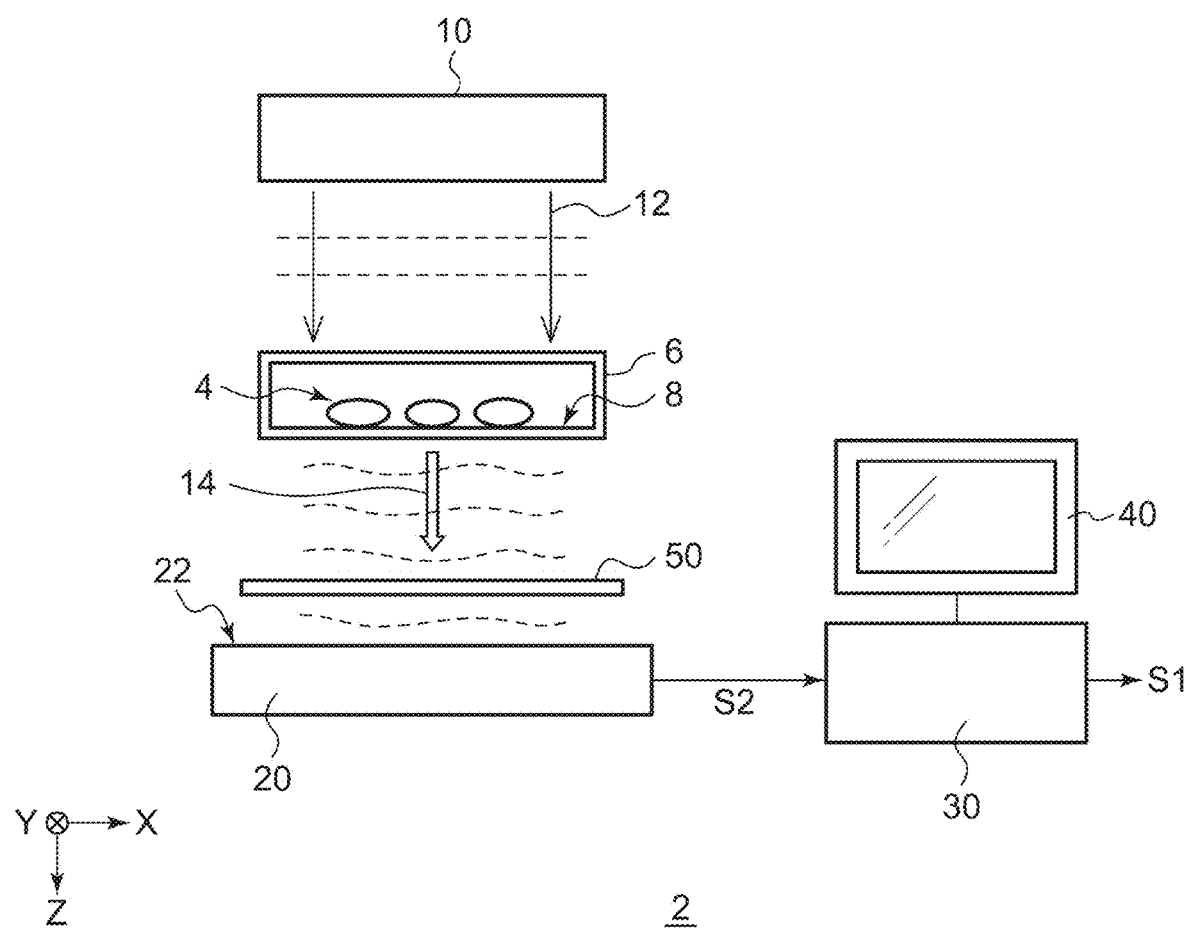
FIG. 1 is a diagram showing a basic configuration of a digital holographic imaging apparatus according to an embodiment.

The invention will now be described based on preferred embodiments which do not intend to limit the scope of the present invention but exemplify the invention. All of the features and the combinations thereof described in the embodiment are not necessarily essential to the invention.

SUMMARY

First, description will be made regarding a summary of several embodiments according to the present invention.

An embodiment of the present invention relates to a digital holographic imaging apparatus. The digital holographic imaging apparatus comprises: an illumination unit structured to emit an illumination light to a specimen; an image sensor comprising multiple pixels arranged on a photoelectric surface thereof in a two-dimensional manner, and structured to capture an image of a magnitude distribution of an interference pattern generated due to the illumination light that has interacted with the specimen; and a limiter structured to limit at least one from among a spatial frequency of the interference pattern formed on the photoelectric surface and an incident angle at which the light is input to the photoelectric surface.

With this embodiment, such an arrangement is capable of reducing or otherwise removing high-frequency components that are higher than the Nyquist frequency of the image captured by the image sensor. This allows a false signal to be removed from or suppressed in an image that represents the phase distribution or otherwise the magnitude distribution of the specimen, and that has been reconstructed by calculation based on the image captured by the image sensor.

Also, the limiter may be arranged between the specimen and the photoelectric surface. By configuring the limiter to interact with the light input to the image sensor, this arrangement is capable of appropriately suppressing and removing the high-frequency components.

Also, with a pixel pitch of the image sensor as p, the limiter may be structured to allow a spatial frequency component that is equal to or lower than ($1/2 \cdot p$) to pass through. This allows a false signal to be appropriately removed or suppressed.

Also, the limiter may comprise an incident angle limiter structured to limit the incident angle at which the light is input to the photoelectric surface. Directing attention to a given region on the image sensor, by limitation of the incident angle at which the light is input to the region, this arrangement is capable of suppressing the high-frequency components of the magnitude distribution formed in this region.

Also, the incident angle limiter may be formed within the image sensor. This allows the limitation of the incident angle at a position that is closest to the photoelectric surface.

Also, the illumination light may be a planar wave. Also, with an output angle of the illumination light as $\theta_{ill}$, with a wavelength thereof as $\lambda$, and with a pixel pitch of the image sensor as p, the incident angle limiter may limit a light input with an incident angle $\theta$ that satisfies a relation represented by $|\sin\theta - \sin\theta_{ill}| > \lambda/2p$.

Also, the illumination light may be a spherical wave. Also, with a wavelength of the illumination light as $\lambda$, with a pixel pitch of the image sensor as p, with a distance between the photoelectric surface and an output surface of the illumination unit as $z_{ill}$, and with a distance between the photoelectric surface and a sample surface on which the specimen is positioned as $Z_{obj}$, the incident angle limiter may be structured to limit the light input with an incident angle $\theta$ that satisfies a relation represented by $|\sin\theta| > \beta\lambda/2p$, with $\beta = z_{ill}/(z_{ill} - Z_{obj})$.

Also, the limiter may comprise an optical low-pass filter.

EMBODIMENTS

Description will be made below regarding the present invention based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

FIG. 1 is a diagram showing a basic configuration of a digital holographic imaging apparatus 2 according to an embodiment. In some cases, the sizes (thickness, length, width, and the like) of each component shown in the drawings are expanded or reduced as appropriate for ease of understanding. The size relation between multiple components in the drawings does not necessarily match the actual size relation between them. That is to say, even in a case in which a given member A has a thickness (length) that is larger than that of another member B in the drawings, in some cases, in actuality, the member A has a thickness (length) that is smaller than that of the member B.

The digital holographic imaging apparatus 2 can be used to observe a phase object, an amplitude object, and an object having both characteristics. That is to say, the observation target is not restricted in particular. Description will be made in the present embodiment regarding an example in which a phase object such as cells is employed as an observation target (specimen 4). The specimen 4 is held at a predetermined position by means of a sample holder 6. The surface on which the specimen 4 is positioned will be referred to as a "sample surface 8". The digital holographic imaging apparatus 2 outputs a subject image S1 that represents the phase distribution of the specimen 4.

The digital holographic imaging apparatus 2 includes an illumination unit 10, an image sensor 20, a processing unit 30, a display apparatus 40, and a limiter 50. The digital holographic imaging apparatus 2 can be configured as a lens-free optical system. However, the digital holographic imaging apparatus 2 may include an unshown optical system as necessary.

The illumination unit 10 emits coherent illumination light 12 to the specimen 4. The configuration of the illumination unit 10 is not restricted in particular. The illumination unit 10 may be configured as a semiconductor laser or an LED. Also, as described later, the illumination light 12 may be generated as plane-wave light or spherical-wave light. FIG. 1 shows an example in which the illumination light 12 is generated as plane-wave light. In the drawings, the light beams are each represented by a solid line, and the wave fronts are each represented by a dotted line.

Figure 2:
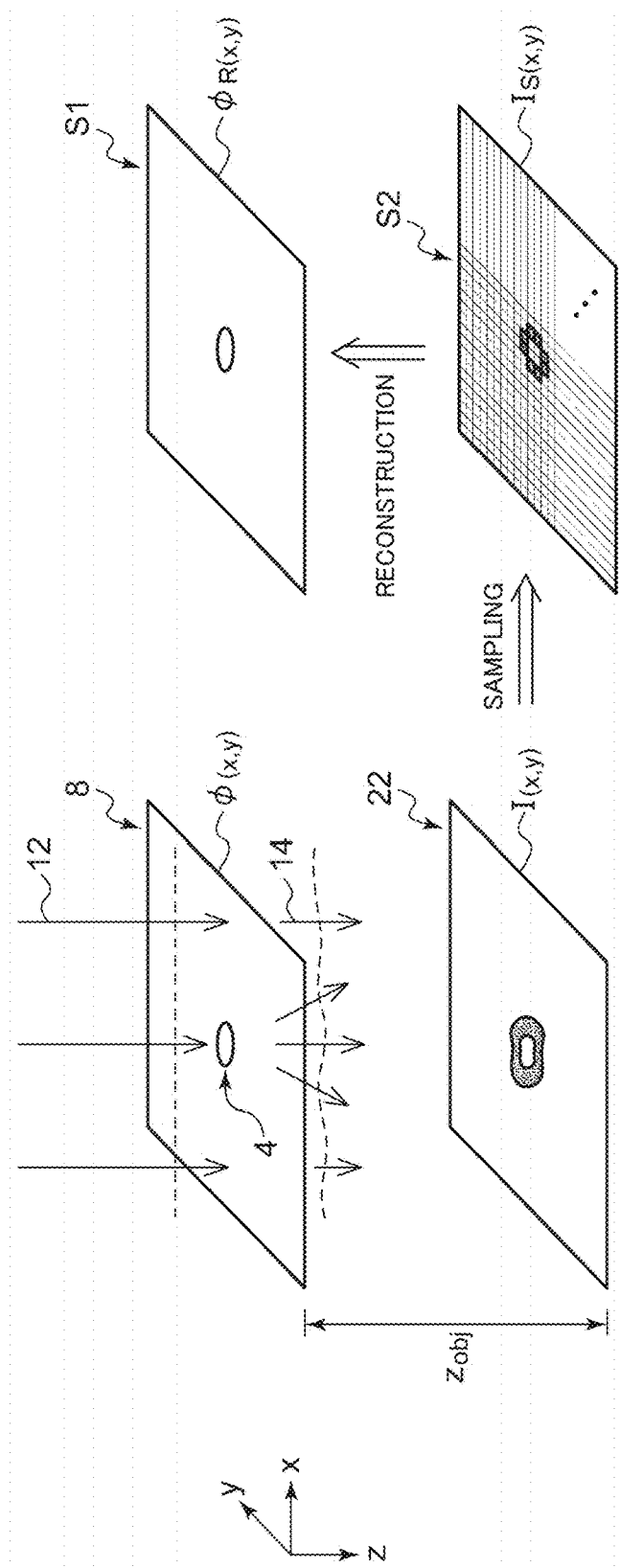
FIG. 2 is a diagram for explaining the principle of the digital holographic imaging apparatus.

FIG. 2 is a diagram for explaining the principle of the digital holographic imaging apparatus 2. The specimen 4 which is a phase object has a phase distribution $\phi(x, y)$ defined in a first direction (x direction) and a second direction (y direction) that is orthogonal to the first direction on the sample surface 8. The phase distribution $\phi(x, y)$ corresponds to the shape, structure, composition, or the like, of the specimen 4. The phase distribution $\phi(x, y)$ is to be observed by means of the digital holographic imaging apparatus 2. The illumination light 14 that passes through the specimen 4 undergoes phase shifting corresponding to the phase distribution $\phi(x, y)$, and accordingly, the wave fronts thereof are disturbed by the specimen 4. The illumination light 14 that has passed through the specimen 4 includes light that has not been disturbed (diffracted) by the specimen 4 and light diffracted by the specimen 4. These lights propagate at a distance of $Z_{obj}$ in the z direction, and generate an interference pattern (which will also be referred to as the "light magnitude distribution") $I(x, y)$ on a photoelectric surface 22 of the image sensor 20.

Returning to FIG. 1, the image sensor 20 is configured as a CCD (Charge Coupled Device), a CMOS (Complementary Metal Oxide Semiconductor) sensor, or the like. The image sensor 20 includes multiple pixels arranged on the photoelectric surface 22 in a two-dimensional manner. The image sensor 20 captures an image of the magnitude distribution $I(x, y)$ of the interference pattern generated by the illumination light 14 that has interacted with the specimen 4, and generates image data S2. As shown in FIG. 20, imaging by means of the image sensor 20 is none other than spatial sampling. The magnitude distribution thus sampled (quantized) will be represented by $I_S(x, y)$. The image data S2 output from the image sensor 20 is input to the processing unit 30.

The processing unit 30 reconstructs the subject image S1 that represents a phase distribution $\phi_R(x, y)$ by calculation based on the magnitude distribution $I_S(x, y)$ represented by the image data S2. The phase distribution $\phi_R(x, y)$ thus reconstructed corresponds to the phase distribution $\phi(x, y)$ of the specimen 4. The processing unit 30 may be configured as a combination of a general-purpose computer and a software program. Also, the processing unit 30 may be configured as a dedicated hardware component. A known method is employed as the calculation processing (algorithm) to reconstruct the subject image S1 based on the image data S2. Accordingly, description thereof will be omitted. For example, a phase retrieval method such as a Fourier iterative method can be employed to reconstruct the subject image S1, for example.

The display apparatus 40 displays the subject image S1 generated by the processing unit 30. Furthermore, the display apparatus 40 has a function as a user interface of the digital holographic imaging apparatus 2.

One of the features of the present embodiment is the limiter 50. Various kinds of variations may be made with respect to the configuration, layout, function, etc., of the limiter 50. As a common configuration, the limiter 50 is configured (i) to limit the spatial frequency of the magnitude distribution $I(x, y)$ generated on the photoelectric surface 22 of the image sensor 20, or (ii) to limit the incident angle of the light input to the photoelectric surface 22, or otherwise to support both functions (i) and (ii). Detailed description thereof will be described later. It should be noted that FIG. 1 shows an arrangement in which the limiter 50 is arranged on an optical path of the illumination light 14. However, the present invention is not restricted to such an arrangement.

The above is the basic configuration of the digital holographic imaging apparatus 2. Next, description will be made regarding the operation thereof.

Figure 3C:
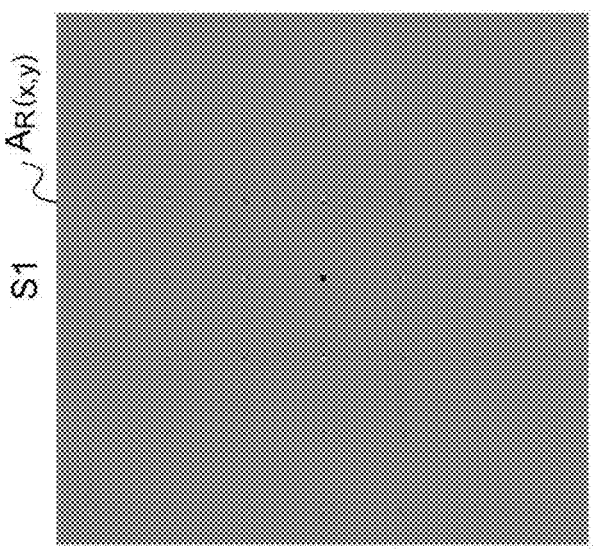
FIGS. 3A through 3C are diagrams each showing a simulation result for the digital holographic imaging apparatus including no limiter.
Figure 3B:
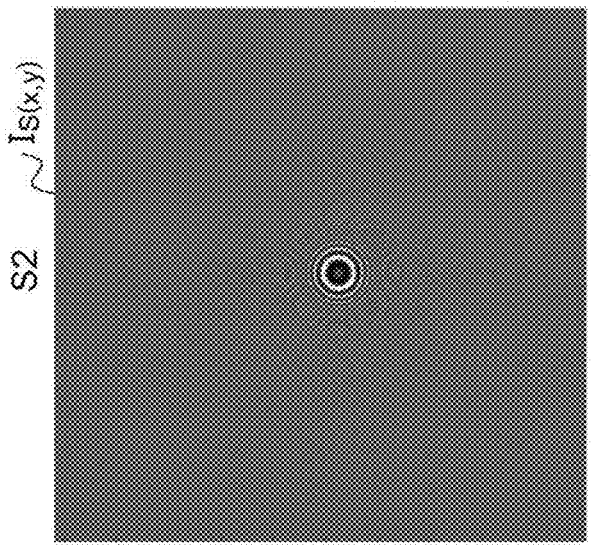
Figure 3A:
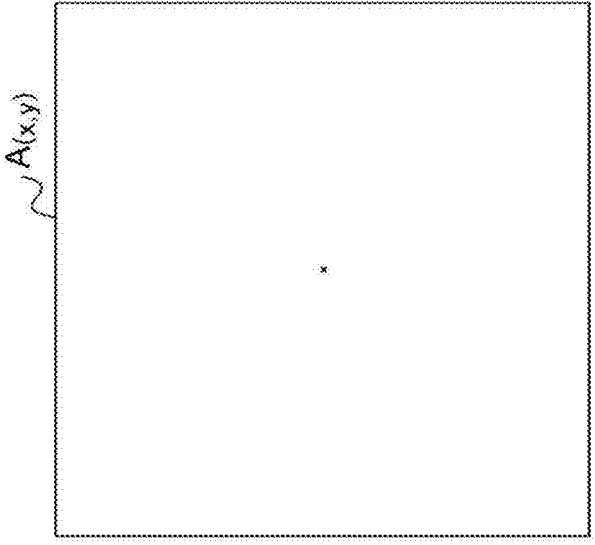

First, description will be made regarding a false signal with reference to FIGS. 3A through 3C. FIGS. 3A through 3C are diagrams each showing a simulation result calculated for a digital holographic imaging apparatus 2 including no limiter 50. For simplicity of description, description will be made regarding an example with an amplitude object. FIG. 3A shows an amplitude distribution $A(x, y)$ on the sample surface 8. Description will be made below regarding an example in which the amplitude object has a transmissivity of 0 in a central region thereof having a radius of 5 μm, and has a transmissivity of 1 in the other area thereof.

FIG. 3B shows the image data S2 (i.e., light magnitude distribution $I_S(x, y)$) acquired by spatially sampling (i.e., capturing) the light magnitude distribution $I(x, y)$ formed on the photoelectric surface 22 of the image sensor 20. The light magnitude distribution $I(x, y)$ formed on the photoelectric surface 22 is derived by Fresnel propagation calculation assuming that light having an amplitude distribution A shown in FIG. 3A propagates in the z direction over a distance of 1 mm between the photoelectric surface 22 and the sample surface 8.

The Nyquist frequency fn of the image sensor 20 designed with a pixel pitch p is represented by $fn = \frac{1}{2}p$. Before the sampling, the light magnitude distribution $I(x, y)$ includes frequency components that are higher than the Nyquist frequency fn. The image data S2, i.e., the light magnitude distribution $I_S(x, y)$, acquired by sampling the light magnitude distribution $I(x, y)$, involves the occurrence of aliasing (folding noise) based on the sampling theorem.

FIG. 3C shows the subject image (amplitude distribution) S1 reconstructed from the image data S2 shown in FIG. 3B. The reconstructed subject image S1 can be derived by Fresnel propagation calculation assuming that the light represented by the image data S2 shown in FIG. 3B propagates over a distance of −1 mm in the z direction. Ideally, the amplitude distribution $A_R(x, y)$ represented by the reconstructed subject image S1 matches the amplitude distribution $A(x, y)$ shown in FIG. 3A. However, in a case in which the light magnitude distribution $I_S(x, y)$ of the image data S2, based on which the subject image S1 is reconstructed, contains folding noise, such folding noise has effects on the entire area of the subject image S1 thus reconstructed. Specifically, false signals occur in a regular manner around the actual image (circle having a radius of 5 μm). The above is the description of the occurrence of false signals.

Figure 4A:
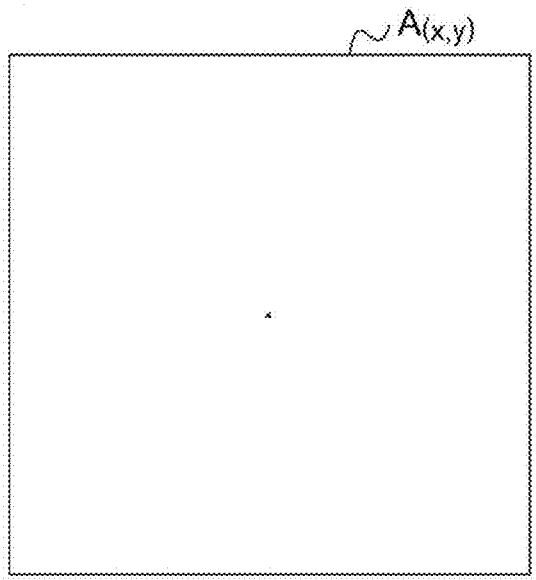
FIGS. 4A through 4D are diagrams each showing a simulation result for the digital holographic imaging apparatus including a limiter.
Figure 4B:
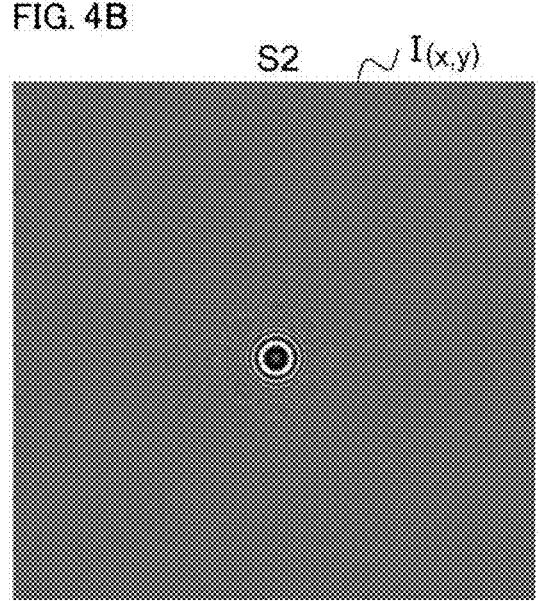
Figure 4C:
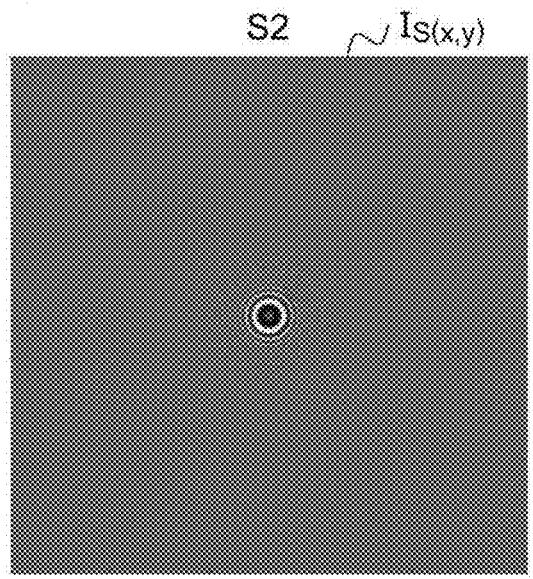
Figure 4D:
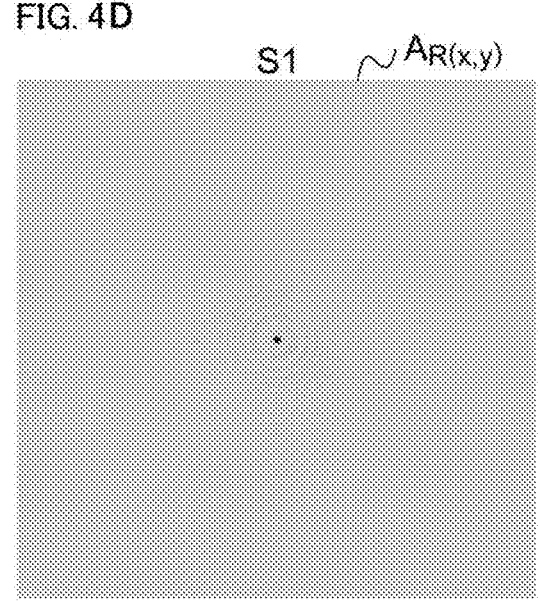

Next, description will be made regarding a method for suppressing such false signals by means of the limiter 50. FIGS. 4A through 4C are diagrams each showing a simulation result calculated for the digital holographic imaging apparatus 2 including the limiter 50. The simulation results shown in FIGS. 4A and 4B are the same as those shown in FIGS. 3A and 3B. FIG. 4C shows the image data S2 that represents the light magnitude distribution $I_S(x, y)$ obtained by spatially sampling the light magnitude distribution $I(x, y)$ formed on the photoelectric surface 22 in a case in which the limiter 50 is enabled. It should be noted that this simulation result is calculated assuming that the limiter 50 is configured as an optical low-pass filter. FIG. 4D shows the subject image S1 (amplitude distribution $A_R(x, y)$) reconstructed from the image data S2 shown in FIG. 4C.

The limiter 50 removes or otherwise attenuates the spatial frequency components that are higher than the Nyquist frequency fn. In a case in which the limiter 50 is enabled, the limiter 50 reduces the high-frequency components that are higher than the Nyquist frequency fn included in the light magnitude distribution $I(x, y)$ formed on the photoelectric surface 22. Accordingly, such an arrangement is capable of reducing the folding noise included in the light magnitude distribution $I_S(x, y)$ shown in FIG. 4C obtained by sampling the light magnitude distribution $I(x, y)$ as compared with the image data S2 shown in FIG. 4B. In the subject image S1 reconstructed from the image data S2 thus generated with attenuated folding noise, the occurrence of such false signals is suppressed.

Figure 5B:
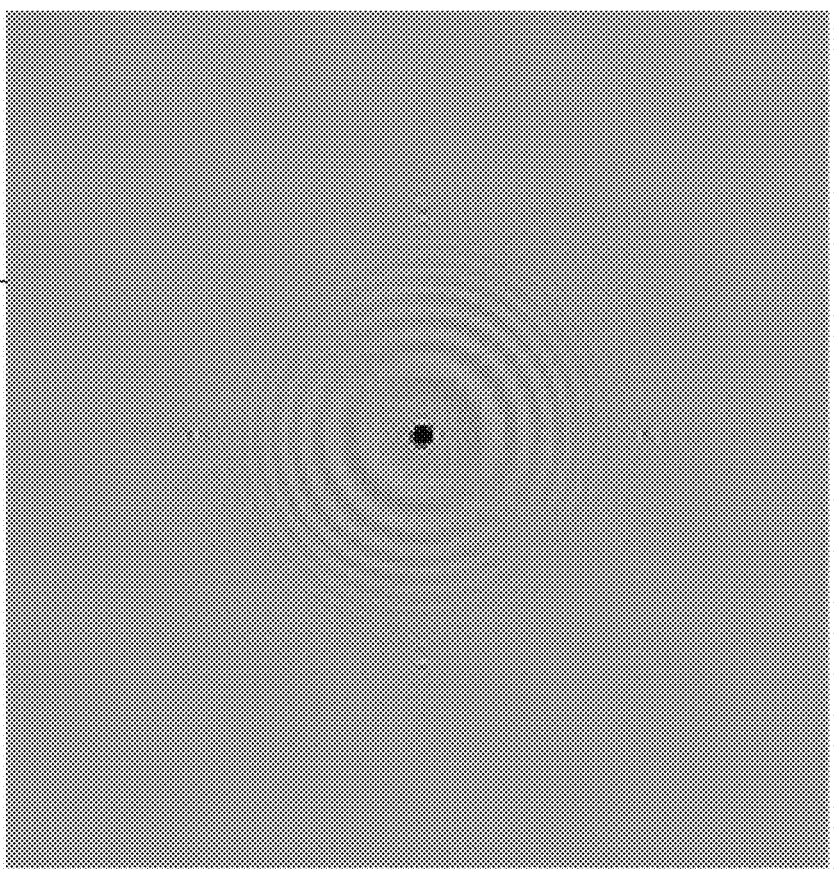
FIGS. 5A and 5B are diagrams showing subject images in a case in which the limiter is disabled and in a case in which the limiter is enabled, respectively.
Figure 5A:
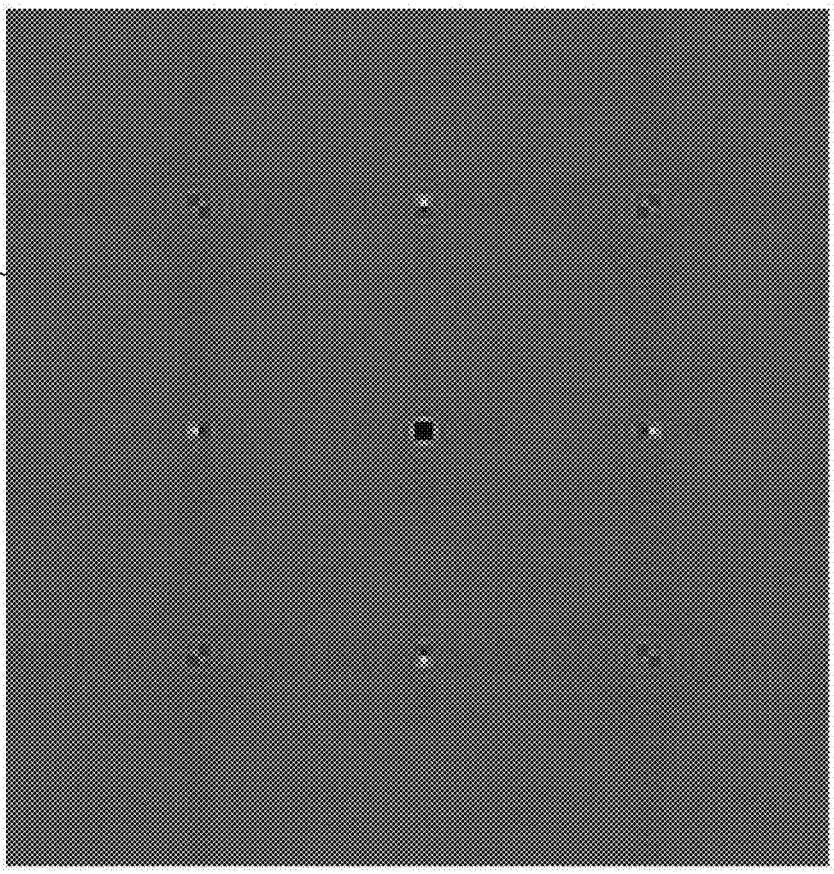

The above is the operation of the digital holographic imaging apparatus 2. FIGS. 5A and 5B are diagrams showing the subject (reconstructed) image S1 in a case in which the limiter 50 is disabled and in a case in which the limiter 50 is enabled, respectively. As can clearly be understood from this comparison result, by providing the limiter 50, this arrangement is capable of suppressing the occurrence of false signals.

Another approach is conceivable in which, in order to suppress the occurrence of false signals, the pixel pitch p is reduced so as to raise the Nyquist frequency fn. However, in a case in which the pixel pitch p is reduced while maintaining the same visual field (image capture area), this involves an increase in the number of pixels of the image sensor 20. An increase in the number of pixels drastically raises the amount of calculation required to reconstruct the subject image S1 from the image data S2. In particular, in a case in which a phase retrieval method (e.g., Fourier iterative method) using iterative calculation is used to generate a reconstructed image, such an effect on an increase in the amount of calculation becomes very large. From this viewpoint, suppression of the occurrence of false signals by means of the limiter 50 also provide an advantage of suppressing an increase in the amount of calculation.

It should be noted that, as a tradeoff disadvantage for suppressing false signals, the subject image S1 shown in FIG. 5B involves the occurrence of a concentric pattern with a coordinate position (x0, y0) as the center, which does not occur in the subject image S1 shown in FIG. 5A. It can be considered that, by optimizing the low-pass filter, or otherwise by employing the limiter 50 that differs from such a low-pass filter, this arrangement is capable of reducing such a concentric pattern. However, in some cases, such a concentric pattern cannot be completely removed, which is undesirable. In order to solve this problem, the image capture mode may be switchable according to the specimen 4 between the image capture mode with the limiter 50 enabled and the image capture mode with the limiter 50 disabled.

The above is the basic configuration of the digital holographic imaging apparatus 2. The present invention encompasses various kinds of apparatuses that can be regarded as a configuration shown in FIG. 1, or otherwise that can be derived from the aforementioned description. That is to say, the present invention is not restricted to a specific configuration. More specific description will be made below regarding an example configuration for clarification and ease of understanding of the essence of the present invention and the circuit operation. That is to say, the following description will by no means be intended to restrict the technical scope of the present invention.

FIRST EMBODIMENT

Figure 6:
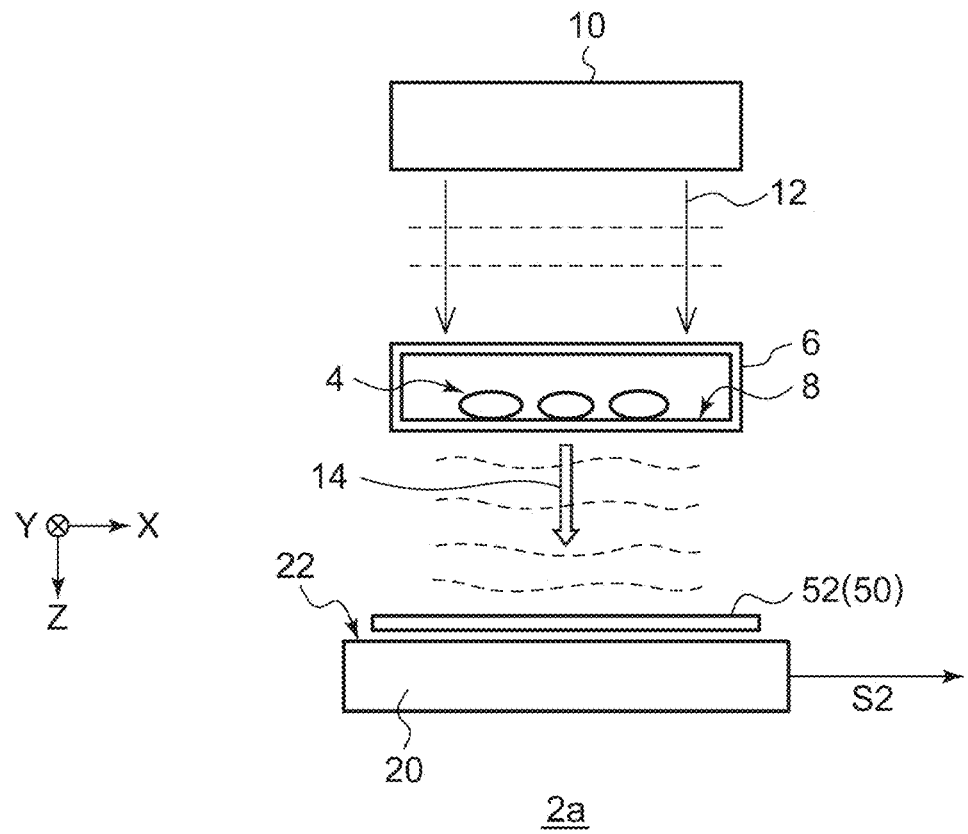
FIG. 6 is a diagram showing a digital holographic imaging apparatus according to a first embodiment.

FIG. 6 is a diagram showing a digital holographic imaging apparatus 2a according to a first embodiment. In the following description, the processing unit 30 and the display unit 40 are not shown. In the present embodiment, the limiter 50 includes an optical low-pass filter 52 as described above. The optical low-pass filter 52 may be formed of a birefringent material such as quartz or the like. Also, the optical low-pass filter 52 may be configured using a micro structure that provides birefringence. In a case in which a light source of the illumination unit 10 emits light that is close to linear polarized light, the illumination unit 10 may preferably be provided with a wave plate so as to provide circular polarized light.

The limiter 50 according to the first embodiment can be regarded as a component that limits the spatial frequency of the interference pattern (light magnitude distribution $I(x, y)$) formed on the photoelectric surface 22. The optical low-pass filter 52 may be arranged between the specimen 4 and the photoelectric surface 22. In a case in which there is a large distance between the optical low-pass filter 52 and the photoelectric surface 22, the high-frequency components included in the light magnitude distribution on a plane on which the optical low-pass filter 52 is positioned are removed. However, after the light further propagates, this arrangement has the potential to involve the occurrence of high-frequency components that are higher than the Nyquist frequency fn in the light magnitude distribution $I(x, y)$ formed on the photoelectric surface 22. For example, in a case in which dust particles having a small diameter adhere to the back surface of the optical low-pass filter or otherwise the back surface of the optical low-pass filter is scratched, this leads to the new occurrence of high-frequency components, which propagate to the photoelectric surface 22, and are sampled by the photoelectric surface 22. Accordingly, the optical low-pass filter 52 is preferably arranged at a position that is as close to the photoelectric surface 22 as possible. By employing such a configuration, this arrangement is capable of localizing the occurrence of the high-frequency components. For example, a sample having a known shape may be measured, and a local region that involves the occurrence of such high-frequency components may be determined. Also, such a local region thus determined may be processed by means of interpolation or the like based on the information with respect to the surrounding pixels. This arrangement is capable of reducing the effects on the subject image S1 obtained in the final stage.

It is essentially effective to suppress the occurrence of the high-frequency components by means of the limiter 50 or in subsequent stages. For example, the optical low-pass filter 52 and the image sensor 20 may be integrally formed. Also, the optical low-pass filter 52 and the image sensor 20 may be bonded with each other with a distance of zero between them.

In a case in which the optical low-pass filter 52 and the image sensor 20 are arranged with a gap between them, the gap may be filled with a sealant such as resin or the like such that the optical low-pass filter 52 and the image sensor 20 are integrally formed. This arrangement is capable of suppressing the adhesion of dust particles, the occurrence of scratching, and the occurrence of high-frequency components due to dust particles or scratching.

As another advantage provided by such an arrangement in which the limiter 50 is arranged in the vicinity of the photoelectric surface 22, this arrangement provides an advantage of suppressing an increase in the height (thickness) of the apparatus.

SECOND EMBODIMENT

Figure 7:
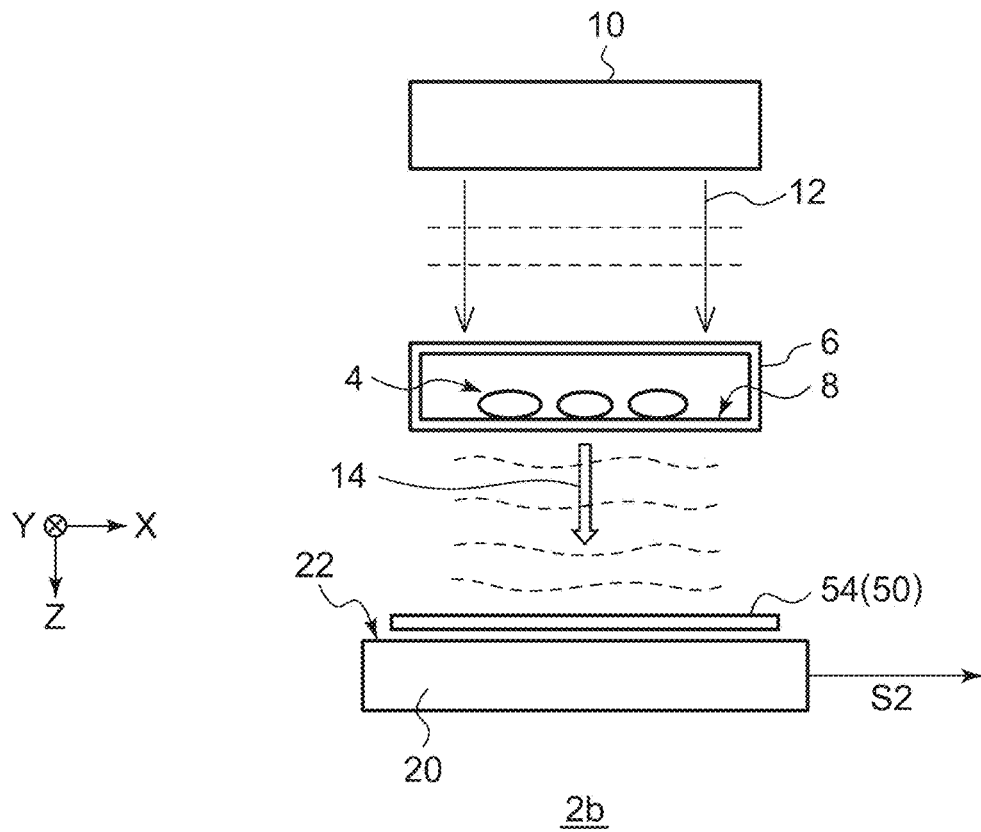
FIG. 7 is a diagram showing a digital holographic imaging apparatus according to a second embodiment.

FIG. 7 is a diagram showing a digital holographic imaging apparatus 2b according to a second embodiment. In this embodiment, the limiter 50 includes an incident angle limiter 54 that limits the incident angle of light input to the photoelectric surface 22. Also, the incident angle limiter 54 is preferably arranged in the vicinity of the photoelectric surface 22 as with an arrangement including the optical low-pass filter 52.

Figure 8A:
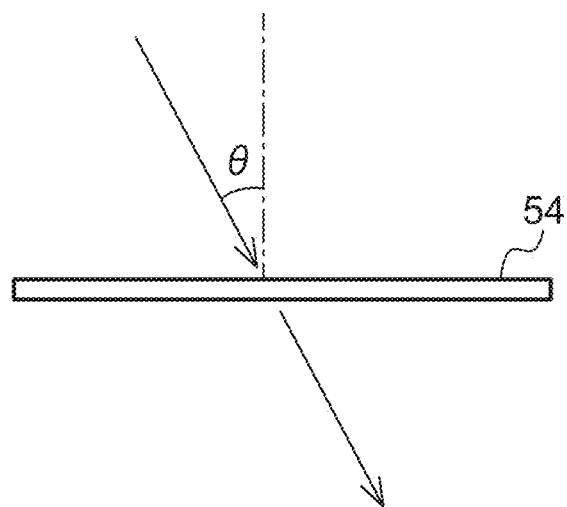
FIGS. 8A and 8B are diagrams for explaining an incident angle limiter.
Figure 8B:
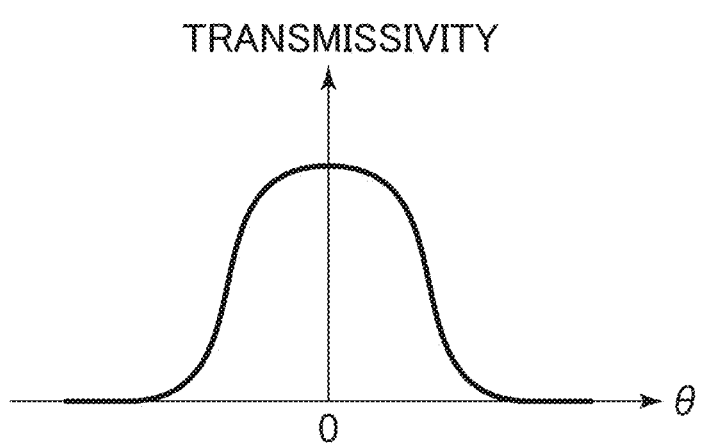

FIGS. 8A and 8B are diagrams for explaining the incident angle limiter 54. FIG. 8A is a cross-sectional diagram showing the incident angle limiter 54. FIG. 8B is a diagram showing the incident angle dependence of the transmissivity of the incident angle limiter 54. The incident angle limiter 54 has a maximum transmissivity for light input in the plane normal direction thereof (with an incident angle $\theta=0$ degrees), and has a low transmissivity for light input in an oblique direction.

The incident angle limiter 54 can be manufactured as a dielectric multilayer film formed on a substrate such as a glass substrate or the like such that it provides transmissivity dependent on the incident angle. The incident angle limiter 54 is preferably designed to provide isotropic transmissivity for polarized light. The incident angle limiter 54 is configured without involving birefringence. Accordingly, this arrangement has an advantage of involving only a small restriction due to polarized light as compared with an arrangement including the optical low-pass filter 52. It should be noted that, in a case in which the incident angle limiter 54 has characteristics having dependence on the polarization direction, a polarizer may be provided as an additional component so as to convert the illumination light 12 into linear polarized light.

The incident angle limiter 54 having the characteristics shown in FIG. 8B is arranged in parallel with the wave fronts of the illumination light 12. This allows light that has not been subjected to disturbance (diffraction) to pass through the incident angle limiter 54. Furthermore, the incident angle limiter 54 suppresses or removes light components diffracted with a large diffraction angle from among the object light components diffracted by the specimen 4.

Figure 9A:
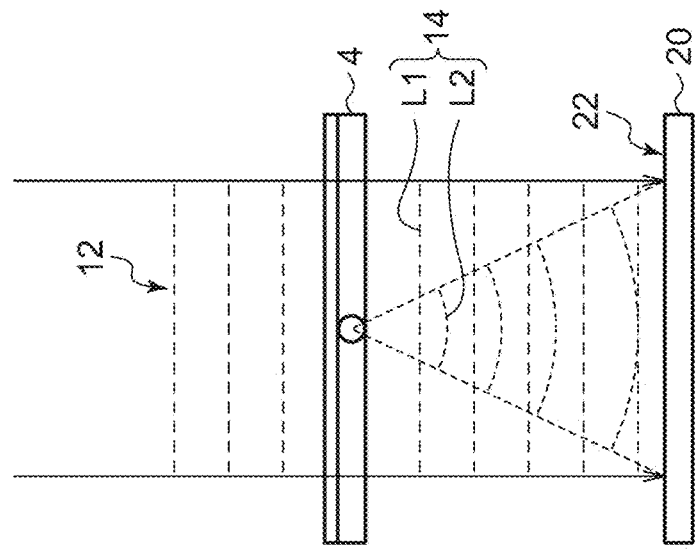
FIGS. 9A through 9C are diagrams for explaining the relation between the interference pattern and the spatial frequency.
Figure 9B:
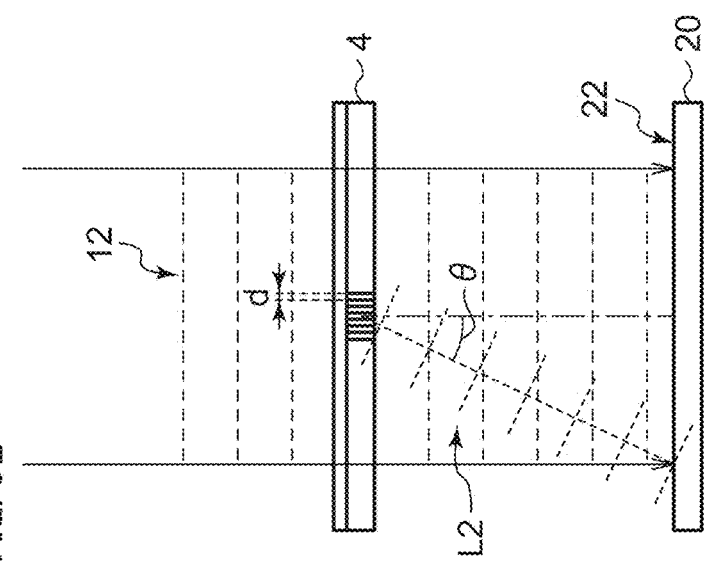
Figure 9C:
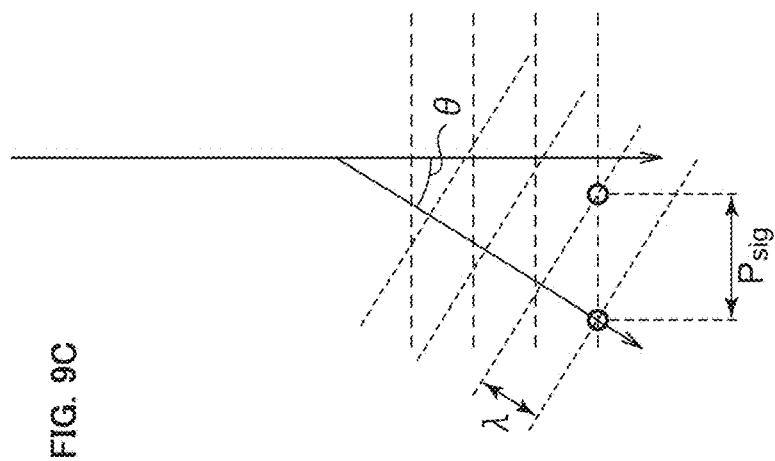

Next, description will be made regarding the operation of the incident angle limiter 54. FIGS. 9A through 9C are diagrams for explaining the relation between the interference pattern and the spatial frequency. For ease of description, description will be made regarding an example in which the illumination light 12 is input with wave fronts that are orthogonal to the plane normal line defined for the image sensor 20. As shown in FIG. 9A, the illumination light 12 is input to the specimen 4. A part of the incident light, i.e., the light L1, is input to the image sensor 20 without being subjected to disturbance (diffraction) due to the specimen 4. Furthermore, another part of the incident light, i.e., the object light L2, is diffracted by the specimen 4, following which the object light L2 is input to the image sensor 20. The interference pattern formed due to the interference between the two lights L1 and L2 is observed by the image sensor 20.

Description will be made with reference to FIG. 9B directing attention to a single spatial frequency (which will be represented as the spatial period d) from among the spatial frequency components provided by the specimen 4. The object light L2 is diffracted according to an equation of diffraction due to a grating such that it propagates in a direction represented by the following Expression (primary light).

$$d \cdot \sin \theta = \lambda$$

That is to say, the propagation direction of the wave fronts of the object light L2 (i.e., beam direction) depends on the spatial frequency provided by the specimen 4.

Description will be made with reference to FIG. 9C regarding the spatial frequency of the interference pattern observed on the image sensor 20. The pitch $P_{sig}$ at which phase matching occurs between the illumination light L1 and the object light L2 is represented by the following Expression $P_{sig} = \lambda / \sin \theta = d$.

It can be understood that the pitch $P_{sig}$ matches the spatial period of the object (1/(spatial frequency)). In a case in which the image sensor 20 is designed with a pixel pitch p, the range of the spatial period of the specimen 4 that can be properly sampled is represented by the Expression $P_{sig} \geq 2p$ based on the Nyquist condition.

With the angle at which a given point of the image sensor 20 is viewed from the specimen 4 as $\theta_M$, the maximum spatial frequency that can be observed at this point on the image sensor 20 is represented by the following Expression.

$$\sin \theta_M / \lambda = NA / \lambda$$

Here, NA represents the numerical aperture.

Figure 10:
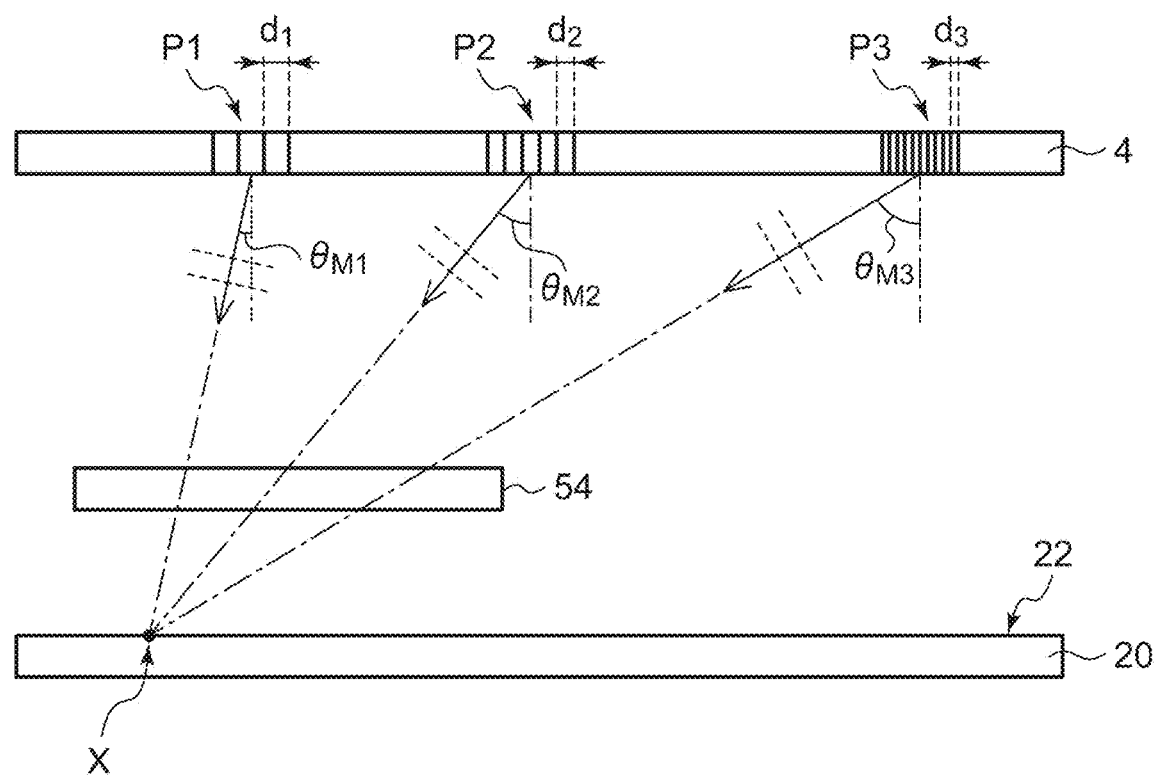
FIG. 10 is a diagram for schematically explaining the operation of the incident angle limiter.

FIG. 10 is a diagram for schematically explaining the operation of the incident angle limiter 54. Description will be made directing attention to a given signal point (observation point) X on the image sensor 20. Description will be made with the angles at which the observation point X is viewed from three points $P_1$, $P_2$, and $P_3$ on the specimen 4 as $\theta_{M1}$, $\theta_{M2}$, and $\theta_{M3}$, respectively. Regarding the point $P_1$, when the specimen 4 provides a spatial period represented by Expression $d1 = \lambda / \sin \theta_{M1}$, the light diffracted at the point $P_1$ is input to the observation point X. This generates an interference pattern with a pitch represented by Expression $P_{sig1} = d_1$.

Similarly, regarding the point $P_2$, when the specimen 4 provides a spatial period represented by Expression $d_2 = \lambda / \sin \theta_{M2}$, the light diffracted at the point $P_2$ is input to the observation point X. This generates an interference pattern with a pitch represented by Expression $P_{sig2} = d_2$.

Similarly, regarding the point $P_3$, when the specimen 4 provides a spatial period represented by Expression $d_3 = \lambda / \sin \theta_M 3$, the light diffracted at the point $P_3$ is input to the observation point X. This generates an interference pattern with a pitch represented by Expression $P_{sig3} = d_3$.

The relation $\theta_{M1} < \theta_{M2} < \theta_{M3}$ holds true, and accordingly, the relation $d_1 > d_2 > d3$ holds true, i.e., the relation $P_{sig1} > P_{sig2} > P_{sig3}$ holds true. That is to say, as the incident angle at which light is input to the observation point X becomes larger, the spatial frequency (pitch) of the interference pattern formed at the observation point X becomes higher (narrower).

The incident angle limiter 54 is configured to limit the incident angle $\theta$ at which light is input to the image sensor 20. This means that the incident angle limiter 54 removes the light component input from the point $P_3$, for example. This allows the high spatial frequency component $P_{sig3}$ generated due to the point $P_3$ to be removed from the magnitude distribution I(x, y) formed on the photoelectric surface 22.

With the second embodiment, the incident angle limiter 54 allows high spatial frequency components to be removed from the interference pattern. This allows the effects of aliasing to be reduced. As can be clearly understood from the description that has been made above, limitation of the incident angle θ at which light is input to the image sensor 20 by means of the incident angle limiter 54 is equivalent to limitation of the spatial frequency of the light magnitude distribution I(x, y) formed on the photoelectric surface 22.

Description has been made above regarding an example in which the illumination light 12 has wave fronts that are orthogonal to the z axis. However, the present invention is not restricted to such an arrangement. Description will be made below regarding several modifications.

FIRST MODIFICATION OF SECOND EMBODIMENT

Figure 11A:
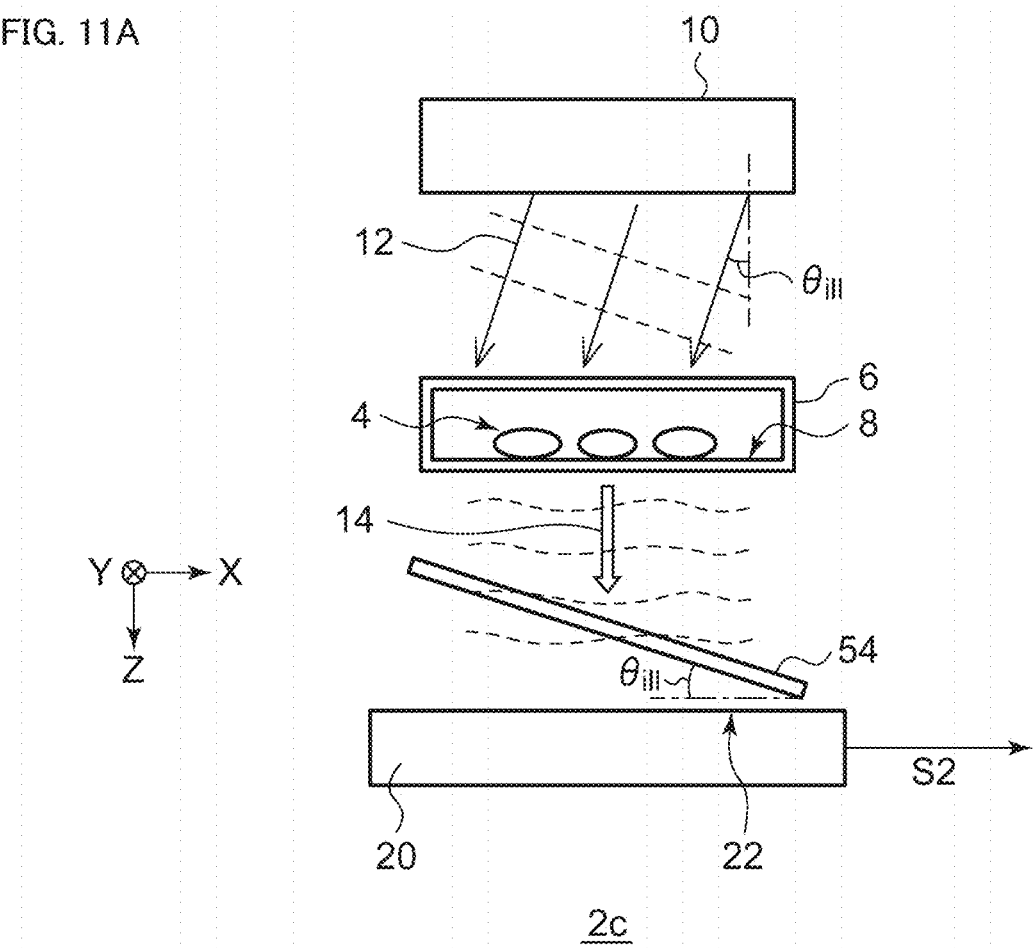
FIG. 11A is a diagram showing a digital holographic imaging apparatus according to a first modification of the second embodiment.

FIG. 11A is a diagram showing a digital holographic imaging apparatus 2c according to a first modification of the second embodiment. With this modification, the illumination unit 10 emits the illumination light 12 having wave fronts that are oblique with respect to the sample surface 8 and the photoelectric surface 22. An incident angle limiter 54c is configured or arranged such that its plane normal line is in parallel with the beam direction of the illumination light 12, i.e., such that the plane normal line is orthogonal to the wave fronts of the illumination light 12. Accordingly, in this modification, with the output angle of the illumination light 12 as $\theta_{ill}$, the incident angle limiter 54c is arranged with an inclination of $\theta_{ill}$ with respect to the photoelectric surface 22.

Figure 11B:
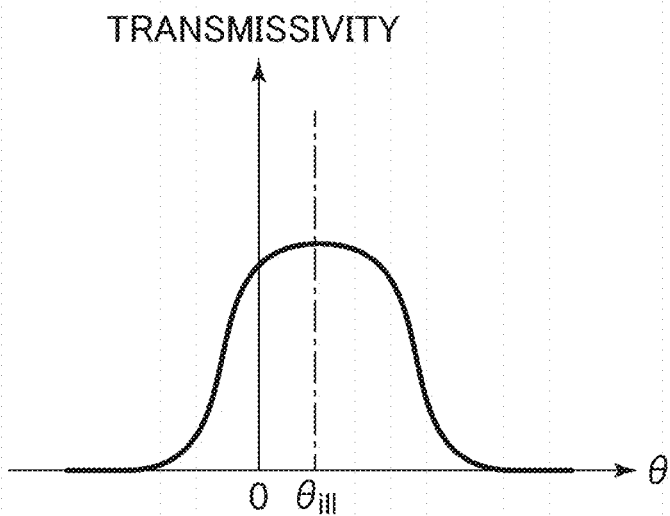
FIG. 11B is a diagram showing the characteristics of the incident angle limiter of the digital holographic imaging apparatus shown in FIG. 11A.

FIG. 11B is a diagram showing the characteristics of the incident angle limiter 54c of the digital holographic imaging apparatus 2c shown in FIG. 11A. Here, θ is defined with the z-axis direction (vertical direction) as zero. By inclining the incident angle limiter 54c having the characteristics shown in FIG. 8B by $\theta_{ill}$, the transmissivity characteristics of the incident angle limiter 54c are shifted. With this arrangement, the incident angle limiter 54c allows light that has not been subjected to disturbance (diffraction) to pass through. Furthermore, the incident angle limiter 54c is capable of suppressing or removing the light components diffracted with a large diffraction angle from the object light diffracted due to the specimen 4.

Next, description will be made regarding desired transmissivity characteristics of the incident angle limiter 54 in a case in which the illumination light 12 is emitted as a parallel wave. With the output angle of the illumination light 12 as $\theta_{ill}$, with the wavelength as λ, and with the pixel pitch of the image sensor 20 as p, the incident angle limiter 54 is designed to limit light input with an incident angle θ represented by the following Expression.

|sin θ−sin $\theta_{ill}$|>λ/2p

Accordingly, the limiter 50 allows light input with an incident angle θ represented by the following Expression to pass through.

|sin θ−sin $\theta_{ill}$|<λ/2p

SECOND MODIFICATION OF SECOND EMBODIMENT

Figure 12A:
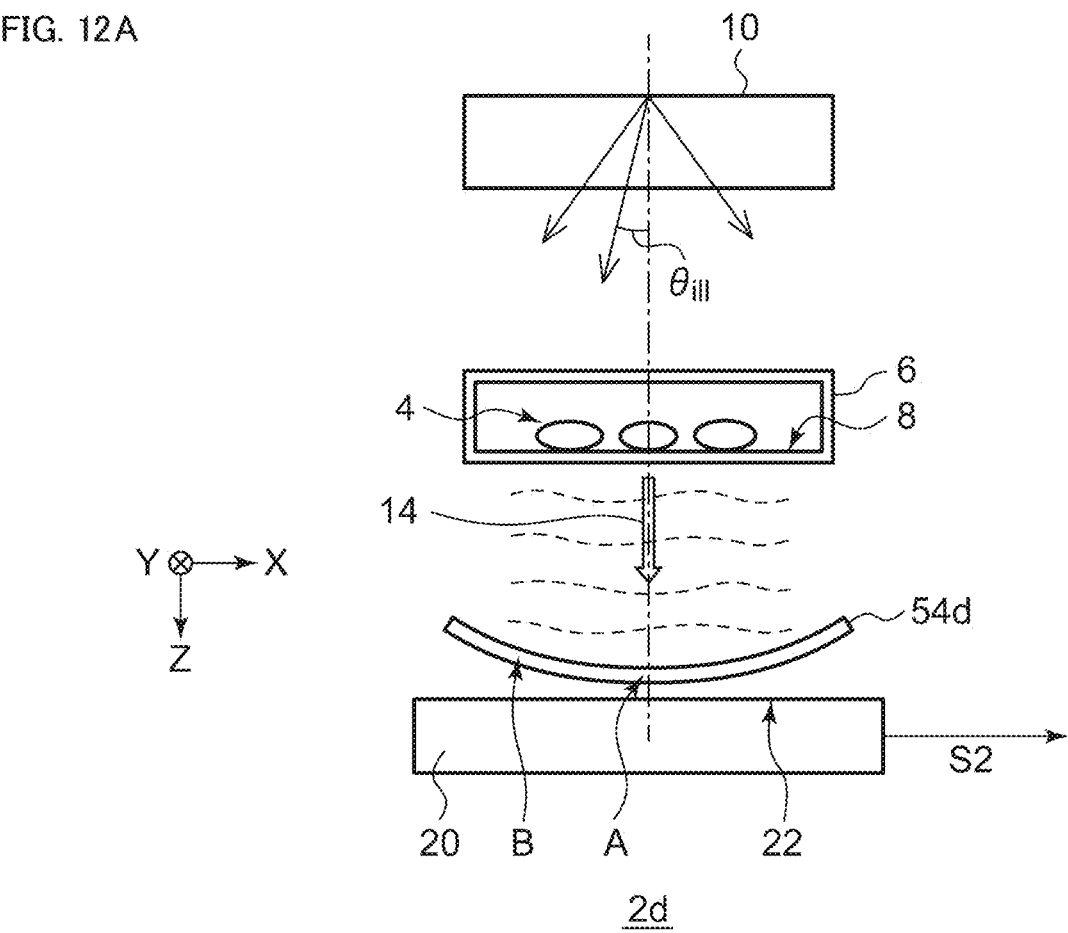
FIG. 12A is a diagram showing a digital holographic imaging apparatus according to a second modification of the second embodiment.

FIG. 12A is a diagram showing a digital holographic imaging apparatus 2d according to a second modification of the second embodiment. With this modification, the illumination unit 10 emits the illumination light 12 configured as a spherical wave. In this modification, an incident angle limiter 54d is configured in the form of a curved spherical plane such that each plane normal line thereof is in parallel with the beam direction of the illumination light 12, i.e., such that each plane normal line thereof is orthogonal to the wave fronts of the illumination light 12. The incident angle limiter 54d is designed to have a radius of curvature that is equal to a distance between it and the spherical center position of the point light source.

Such an incident angle limiter 54d may be manufactured as a dielectric multilayer film formed on a substrate bent beforehand such that it provides transmissivity dependent on the incident angle.

Figure 12B:
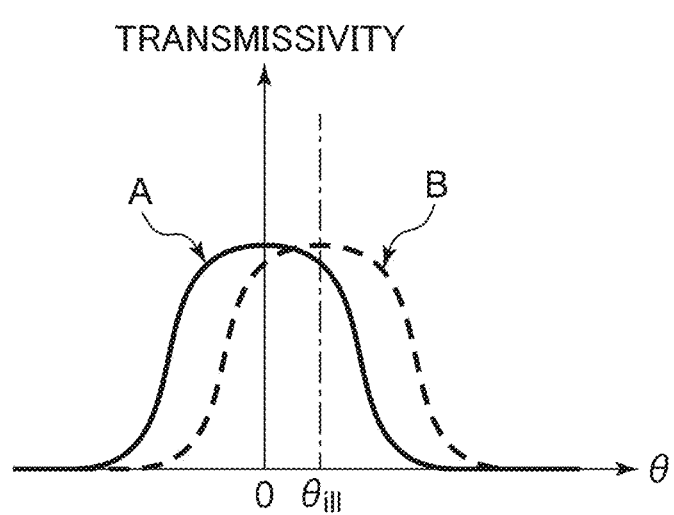
FIG. 12B is a diagram showing the characteristics of the incident angle limiter of the digital holographic imaging apparatus shown in FIG. 12A.

FIG. 12B is a diagram showing the characteristics of the incident angle limiter 54d for the digital holographic imaging apparatus 2d shown in FIG. 12A. Here, θ is defined with the z-axis direction (vertical direction) as zero. By bending the incident angle limiter 54d such that the maximum transmissivity becomes that for the incident light input in the plane normal direction, this arrangement is capable of shifting the transmissivity characteristics for the points A and B. With this arrangement, the incident angle limiter 54d allows light that has not been subjected to disturbance (diffraction) to pass through. Furthermore, the incident angle limiter 54d is capable of suppressing or removing the light components diffracted with a large diffraction angle from the object light diffracted due to the specimen 4.

Next, description will be made regarding desired transmissivity characteristics of the incident angle limiter 54d in a case in which the illumination light 12 is emitted as a spherical wave. With the wavelength of the illumination light 12 as λ, with the pixel pitch of the image sensor 20 as p, with the distance between the photoelectric surface 22 and the output surface of the illumination unit 10 as $z_{ill}$, and with the distance between the photoelectric surface 22 and the sample surface 8 as $Z_{obj}$, the incident angle limiter 54 limits light input with an incident angle θ represented by the following Expression.

|sin θ|>βλ/2p

Here, β is represented by Expression $\beta=z_{ill}/(z_{ill}-Z_{obj})$.

Accordingly, this arrangement allows light that satisfies the relation |sin θ|<βλ/2p to pass through the incident angle limiter 54d, and allows this light to be input to the image sensor 20.

It should be noted that, in a case in which the illumination light 12 is input in an oblique direction, the incident angle limiter 54 may be arranged in parallel with the photoelectric surface 22. In this case, film may preferably be formed such that the maximum transmissivity of the incident angle limiter 54 is that for the incident angle $\theta_{ill}$.

Also, in a case in which the illumination light 12 is emitted as a spherical wave, the incident angle limiter 54 may be designed to have a planar shape. In this case, film may be formed such that the transmissivity of the incident angle limiter 54 is dependent on the position on the incident angle limiter 54.

THIRD EMBODIMENT

Figure 13:
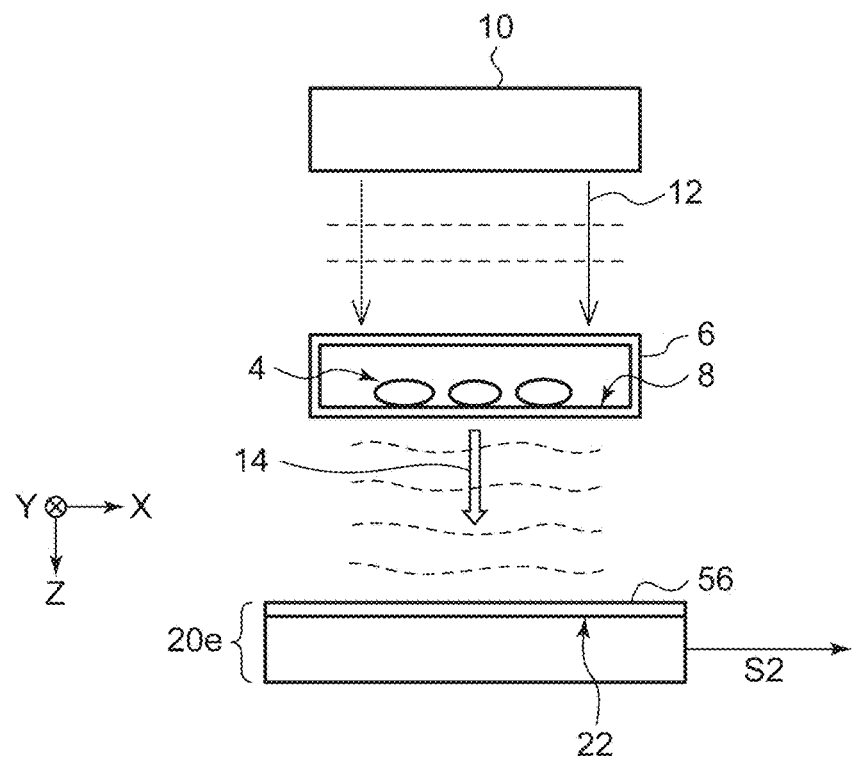
FIG. 13 is a diagram showing a digital holographic imaging apparatus according to a third embodiment.

FIG. 13 is a diagram showing a digital holographic imaging apparatus 2e according to a third embodiment. In this embodiment, the limiter 50 includes an incident angle limiter 56 that limits the incident angle of the light input to the photoelectric surface 22 as with the second embodiment.

However, the point of difference is that the incident angle limiter 56 is formed within an image sensor 20e.

Figure 14:
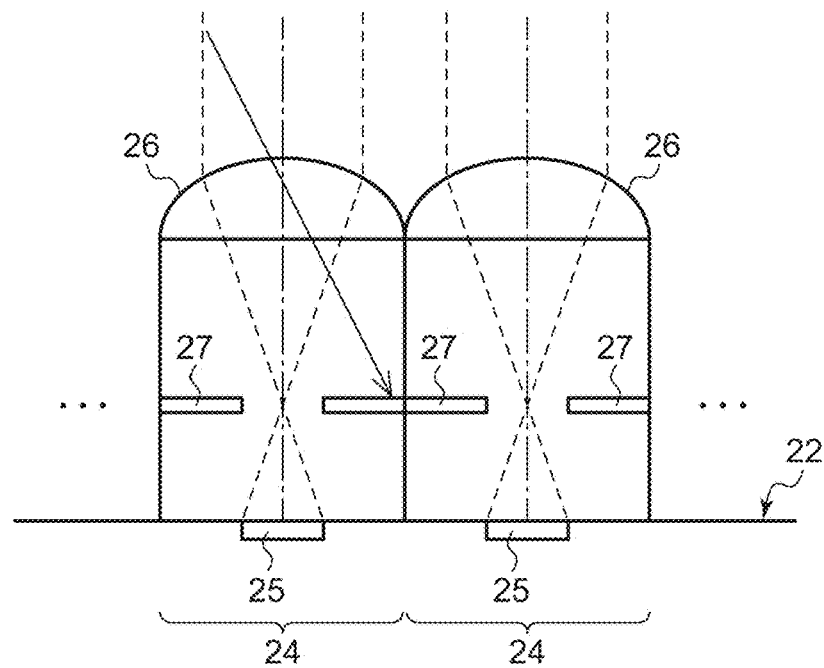
FIG. 14 is a cross-sectional diagram showing an image sensor including an incident angle limiter as a built-in component.

FIG. 14 is a cross-sectional diagram showing the image sensor 20e including the incident angle limiter 56 as a built-in component. Description will be made regarding an example of front-side illumination (FSI). Also, the same configuration may be employed with back-side illumination (BSI). The image sensor 20e includes multiple pixels 24 arranged in a matrix manner. Each pixel 24 includes a photoelectric conversion element 25, a micro lens 26, and a shading unit 27. The shading unit 27 is configured to provide an aperture defined in the vicinity of the position of the focal point of the micro lens 26. The shading unit 27 functions together with the micro lens 26 as the incident angle limiter 56 that limits the incident angle at which the incident light is input to the photoelectric conversion element 25. The shading unit 27 may be formed by a semiconductor manufacturing process.

The incident angle limiter 56 according to the third embodiment has an advantage of further reducing restriction on the polarization of the light source. Accordingly, such an arrangement requires no polarizer or the like.

With the first or second embodiment, a planar member such as the optical low-pass filter 52 or the incident angle limiter 54 is arranged between the image sensor 20 and the specimen 4. This arrangement has the potential to cause the occurrence of an undesired interference pattern due to multiple reflection. In a case in which no countermeasure is applied, this arrangement has the potential to cause degradation of the image quality. In contrast, with the third embodiment, this arrangement does not involve such a planar member, thereby removing the effects of such multiple reflection. This allows the image quality to be improved.

With the third embodiment, the wave fronts of the illumination light 12 are also not restricted to those of a plane wave that is orthogonal to the z axis.

FIRST MODIFICATION OF THIRD EMBODIMENT

Figure 15:
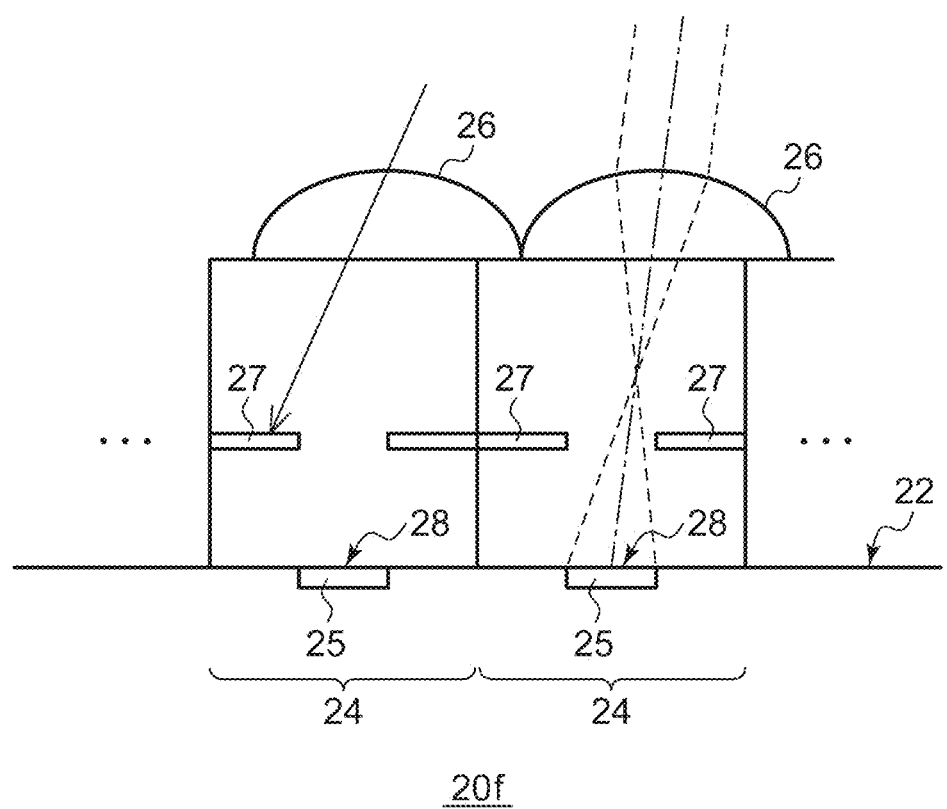
FIG. 15 is a cross-sectional diagram showing an image sensor according to a first modification of the third embodiment.

FIG. 15 is a cross-sectional diagram showing an image sensor 20f according to a first modification of the third embodiment. The image sensor 20f is preferably applied to an arrangement in which the illumination light 12 is emitted at an inclination with respect to the z axis as shown in FIG. 11A. In this modification, each micro lens 26 is arranged such that the apex (center point) thereof is arranged with an offset from the center 28 of the corresponding photoelectric conversion element 25. By optimizing the offset amount, this arrangement provides the transmissivity characteristics as shown in FIG. 11B.

SECOND MODIFICATION OF THIRD EMBODIMENT

Figure 16:
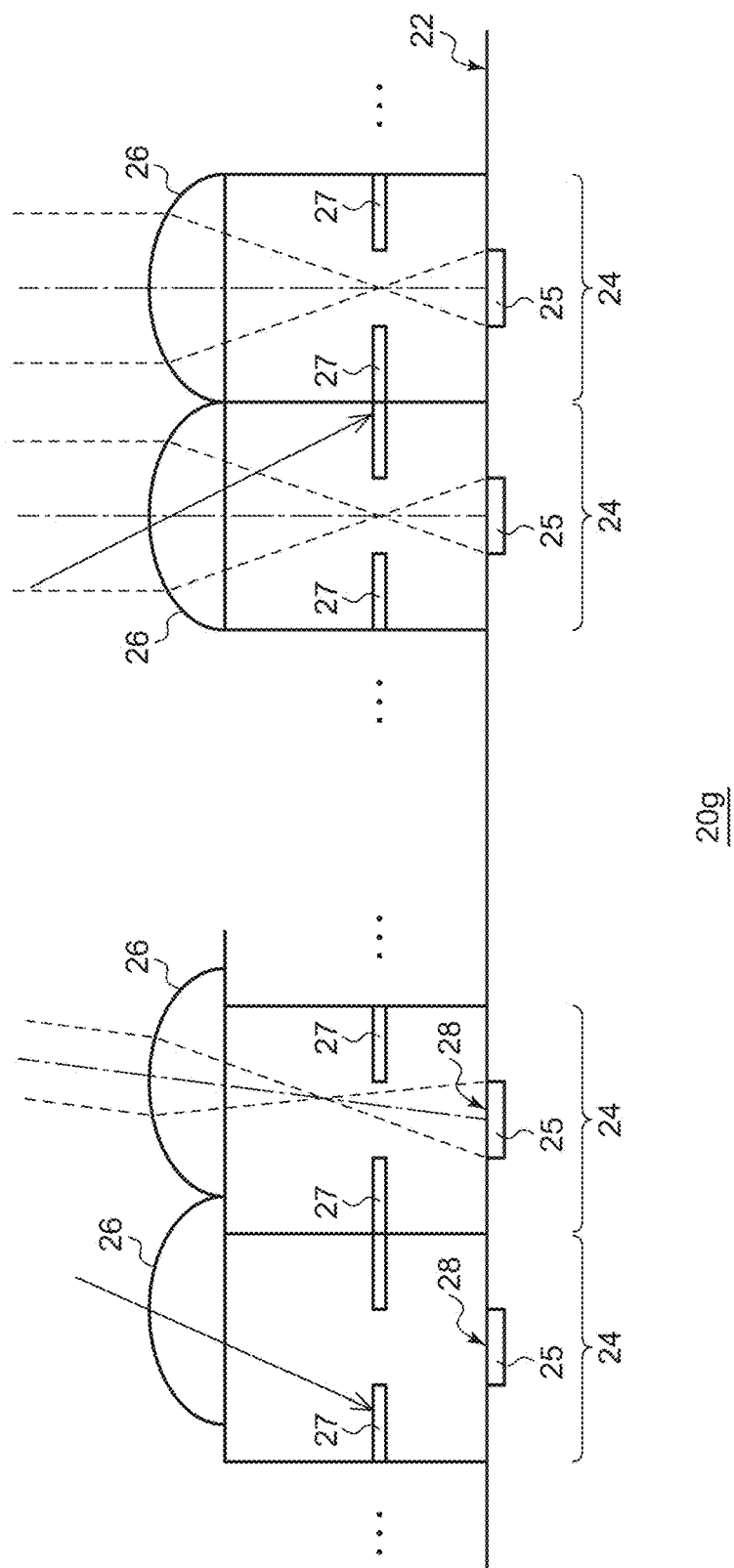
FIG. 16 is a cross-sectional diagram showing an image sensor according to a second modification of the third embodiment.

FIG. 16 is a cross-sectional diagram showing an image sensor 20g according to a second modification of the third embodiment. The image sensor 20g can preferably be applied to an arrangement in which the illumination light 12 is emitted as a spherical wave. In this modification, the offset amount between the apex (center point) of the micro lens 26 and the center 28 of the photoelectric conversion element 25 is set to a different value for each pixel. Preferably, the lines each defined for each pixel to pass through the center point of the micro lens 26 and the center point of the photoelectric conversion element 25 of the corresponding pixel intersect with each other at the spherical center position of the illumination light 12. This arrangement is capable of providing the transmissivity characteristics as shown in FIG. 12B.

THIRD MODIFICATION OF THIRD EMBODIMENT

In addition to or otherwise instead of providing each micro lens 26 with an offset as shown in FIG. 15 or 16, the shading unit 27 may be provided with a different opening diameter for each pixel.

FOURTH EMBODIMENT

Figure 17:
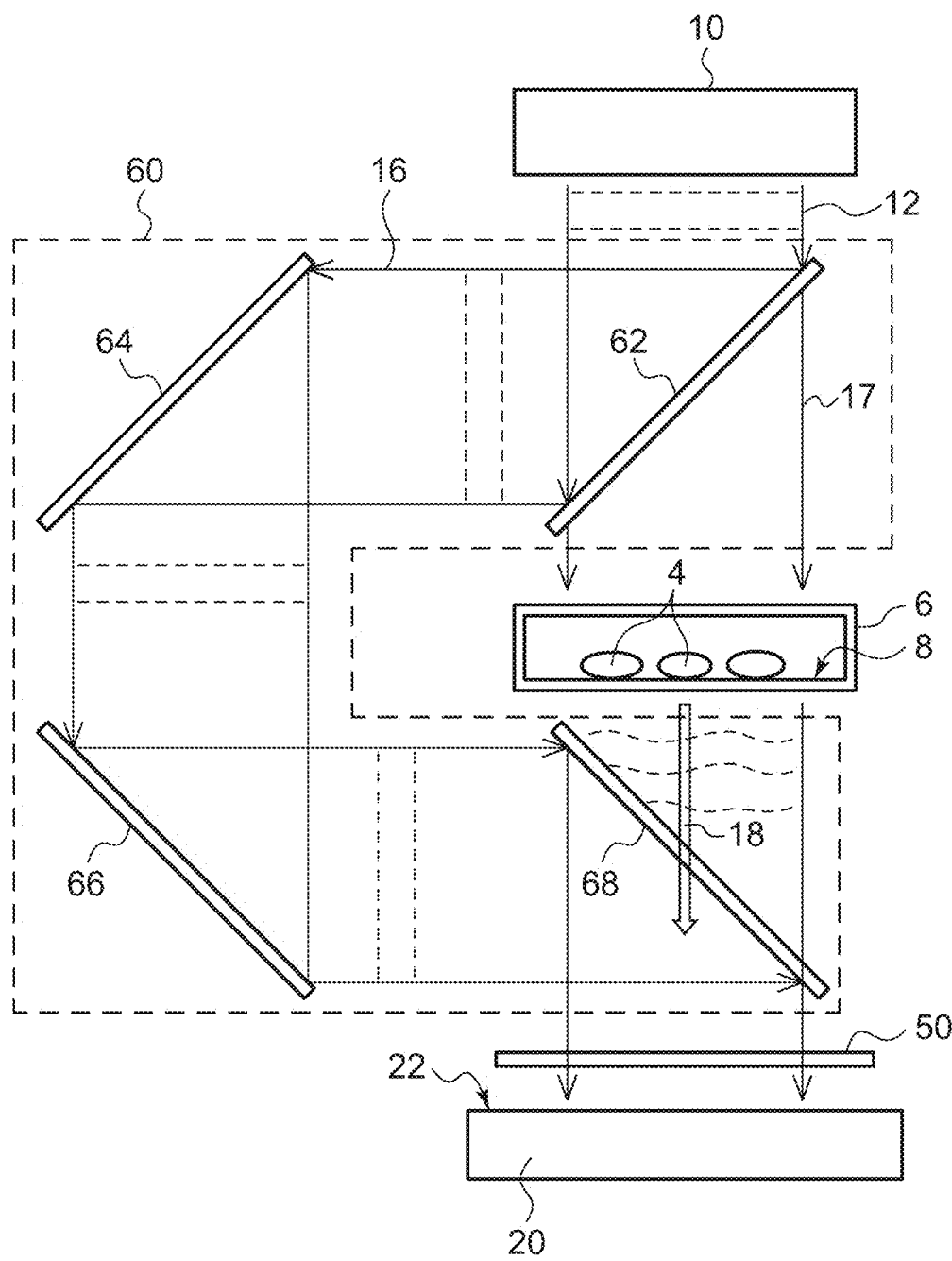
FIG. 17 is a diagram showing a digital holographic imaging apparatus according to a fourth embodiment.

FIG. 17 is a diagram showing a digital holographic imaging apparatus 2h according to a fourth embodiment. The digital holographic imaging apparatus 2h further includes an additional optical system 60 in addition to the digital holographic imaging apparatus 2 shown in FIG. 1. A beam splitter 62 of the optical system 60 splits the illumination light 12 into a reference light 16 and an object light 17. The reference light 16 is reflected by mirrors 64 and 66 and a beam splitter 68, and is input to the image sensor 20. The object light 17 is emitted to the specimen 4. After the object light 18 interacts with the specimen 4, the object light 18 passes through the beam splitter 68, and is input to the image sensor 20. An interference pattern is formed on the photoelectric surface 22 due to the reference light 16 and the object light 18.

The present invention is applicable to such a digital holographic imaging apparatus having separate paths for the reference light and the object light. In the fourth embodiment, the limiter 50 may be configured as any one from among the optical low-pass filter 52 and the incident angle limiters 54 and 56.

Description has been made above regarding the present invention with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made in the embodiments regarding the digital holographic imaging apparatus 2 that measures the light that passes through the specimen 4. Also, the digital holographic imaging apparatus may be configured to measure reflected light.

Description has been made in the embodiments regarding an arrangement in which the specimen 4 is configured as a phase object that provides a phase distribution. Also, the specimen 4 may be configured as an amplitude object that provides an amplitude distribution. Also, the specimen 4 may be configured as an object that provides both a phase distribution and an amplitude distribution.

The limiter 50 may apply micro-vibration to the image sensor 20 or otherwise the specimen 4 during an exposure period.

Examples of the specimen 4 include semiconductor devices, metal materials, and the like, in addition to cells.

While the preferred embodiments of the present invention have been described using specific terms, such description is for illustrative purposes only, and it is to be understood that changes and variations may be made without departing from the spirit or scope of the appended claims.

What is claimed is:

1. A digital holographic imaging apparatus comprising:
a light source structured to emit a coherent illumination light to a specimen;
an image sensor comprising a plurality of pixels arranged on a photoelectric surface thereof in a two-dimensional manner, and structured to capture an image of a magnitude distribution of an interference pattern generated due to the coherent illumination light that has interacted with the specimen; and
a limiter structured to limit at least one from among a spatial frequency of the interference pattern formed by the coherent illumination light on the photoelectric surface and an incident angle at which the coherent illumination light is input to the photoelectric surface, wherein:
the limiter comprises an incident angle limiter structured to limit the incident angle at which the light is input to the photoelectric surface;
the coherent illumination light is a planar wave; and
with an output angle of the coherent illumination light as $\theta_{ill}$, with a wavelength thereof as $\lambda$, and with a pixel pitch of the image sensor as p, the incident angle limiter limits a light input with an incident angle $\theta$ that satisfies a relation represented by $|\sin\theta - \sin\theta_{ill}| > \lambda/2p$.

2. The digital holographic imaging apparatus according to claim 1, wherein the limiter is arranged between the specimen and the photoelectric surface.

3. The digital holographic imaging apparatus according to claim 1, wherein, with a pixel pitch of the image sensor as p, the limiter is structured to allow a spatial frequency component that is equal to or lower than ($\frac{1}{2}\cdot p$) to pass through.

4. The digital holographic imaging apparatus according to claim 1, wherein the incident angle limiter is formed within the image sensor.

5. The digital holographic imaging apparatus according to claim 1, wherein the limiter comprises an optical low-pass filter.

6. The digital holographic imaging apparatus according to claim 1, wherein the limiter is arranged between the specimen and the photoelectric surface in the vicinity of the photoelectric surface.

7. The digital holographic imaging apparatus according to claim 1, further comprising a computer that is configured to determine a region in which a high-frequency component has occurred on the photoelectric surface due to a light path from the limiter up to the photoelectric surface, and
wherein each pixel value in the region in which the high-frequency components have occurred is interpolated using a pixel in the vicinity of the high-frequency component occurrence region.

8. The digital holographic imaging apparatus according to claim 1, wherein the limiter and the image sensor are integrally formed.

9. The digital holographic imaging apparatus according to claim 1, further comprising a sealing structure that seals a space between the limiter and the photoelectric surface.

10. A digital holographic imaging apparatus comprising:
a light source structured to emit a coherent illumination light to a specimen;
an image sensor comprising a plurality of pixels arranged on a photoelectric surface thereof in a two-dimensional manner, and structured to capture an image of a magnitude distribution of an interference pattern generated due to the coherent illumination light that has interacted with the specimen; and
a limiter structured to limit at least one from among a spatial frequency of the interference pattern formed by the coherent illumination light on the photoelectric surface and an incident angle at which the coherent illumination light is input to the photoelectric surface, wherein:
the limiter comprises an incident angle limiter structured to limit the incident angle at which the light is input to the photoelectric surface;
the coherent illumination light is a spherical wave; and
with a wavelength of the coherent illumination light as $\lambda$, with a pixel pitch of the image sensor as p, with a distance between the photoelectric surface and an output surface of the light source as $z_{ill}$, and with a distance between the photoelectric surface and a sample surface on which the specimen is positioned as $Z_{obj}$, the incident angle limiter is structured to limit the light input with an incident angle $\theta$ that satisfies a relation represented by $|\sin\theta| > \beta\lambda/2p$, with $\beta = x_{ill}/(z_{ill} - Z_{obj})$.

11. The digital holographic imaging apparatus according to claim 10, wherein the limiter is arranged between the specimen and the photoelectric surface.

12. The digital holographic imaging apparatus according to claim 10, wherein, with a pixel pitch of the image sensor as p, the limiter is structured to allow a spatial frequency component that is equal to or lower than ($\frac{1}{2}\cdot p$) to pass through.

13. The digital holographic imaging apparatus according to claim 10, wherein the incident angle limiter is formed within the image sensor.

14. The digital holographic imaging apparatus according to claim 10, wherein the limiter comprises an optical low-pass filter.

15. The digital holographic imaging apparatus according to claim 10, wherein the limiter is arranged between the specimen and the photoelectric surface in the vicinity of the photoelectric surface.

16. The digital holographic imaging apparatus according to claim 10, further comprising a computer that is configured to determine a region in which a high-frequency component has occurred on the photoelectric surface due to a light path from the limiter up to the photoelectric surface, and
wherein each pixel value in the region in which the high-frequency components have occurred is interpolated using a pixel in the vicinity of the high-frequency component occurrence region.

17. The digital holographic imaging apparatus according to claim 10, wherein the limiter and the image sensor are integrally formed.

18. The digital holographic imaging apparatus according to claim 10, further comprising a sealing structure that seals a space between the limiter and the photoelectric surface.

* * * * *